US008322552B2

(12) United States Patent  (10) Patent No.: US 8,322,552 B2
Siddiqui  (45) Date of Patent: Dec. 4, 2012

(54) FUEL FILLER SYSTEM FOR AUTOMOTIVE VEHICLE

(75) Inventor: Shahid Ahmed Siddiqui, Northville, MI (US)

(73) Assignee: Ford Global Technologies, Dearborn, MI (US)

( * ) Notice: Subject to any disclaimer, the term of this patent is extended or adjusted under 35 U.S.C. 154(b) by 290 days.

(21) Appl. No.: 12/684,843

(22) Filed: Jan. 8, 2010

(65) Prior Publication Data

US 2011/0168705 A1  Jul. 14, 2011

(51) Int. Cl.
*B65D 47/02* (2006.01)
(52) U.S. Cl. .................. 220/86.2; 220/304; 220/287
(58) Field of Classification Search .......... 220/562, 220/802, 801, 803, 804, 295, 293, 288, 287, 220/790, 789, 780, 796, 304, 294, 378, 526, 220/525, 523; 215/344, 343, 341, 316, 200; 137/800; *B65D 47/02, 49/00*
See application file for complete search history.

(56) References Cited

U.S. PATENT DOCUMENTS

| | | | | |
|---|---|---|---|---|
| 2,886,203 A * | 5/1959 | Goll | ............................. | 220/801 |
| 3,477,611 A * | 11/1969 | Niles | ............................. | 220/86.2 |
| 3,580,414 A * | 5/1971 | Ginsburgh et al. | .......... | 220/86.2 |
| 3,845,841 A * | 11/1974 | Kloefkorn | .................... | 180/69.4 |
| 3,907,153 A * | 9/1975 | Mutty | ......................... | 220/86.2 |
| 4,651,889 A * | 3/1987 | Uranishi et al. | ............. | 220/86.2 |
| 5,439,129 A * | 8/1995 | Buechler | ...................... | 220/86.2 |
| 5,507,324 A * | 4/1996 | Whitley et al. | ................ | 141/59 |
| 6,375,028 B1 * | 4/2002 | Smith | ........................ | 220/258.1 |
| 6,637,477 B1 * | 10/2003 | Maier | ........................... | 141/350 |
| 2002/0185187 A1 * | 12/2002 | Zimmer et al. | .............. | 138/109 |
| 2008/0276853 A1 * | 11/2008 | Dorst | ............................ | 114/173 |
| 2009/0056829 A1 * | 3/2009 | Aitken et al. | ................. | 141/348 |
| 2010/0206835 A1 * | 8/2010 | Yu | ................................. | 215/355 |

FOREIGN PATENT DOCUMENTS

GB  2360032 A  *  9/2001

* cited by examiner

*Primary Examiner* — Mickey Yu
*Assistant Examiner* — Robert J Hicks
(74) *Attorney, Agent, or Firm* — Jerome R. Drouillard; Julia Voutyras

(57) ABSTRACT

A fuel filler system for an automotive vehicle includes a filler pipe connected with a fuel tank and an interceptor mounted about an open end of the filler pipe, with the interceptor and filler pipe defining a generally annular contaminant collector having a drain extending from the collector. A filler cap closes both the open end of the filler pipe and the open end of the interceptor, so as to prevent ambient contamination from entering either the contaminant collector or the filler pipe. Removal of the filler cap from the filler pipe first causes venting of the fuel tank into the collector before a sealing condition between the filler cap and the interceptor is released.

10 Claims, 3 Drawing Sheets

FUEL FILLER SYSTEM FOR AUTOMOTIVE VEHICLE

BACKGROUND OF THE DISCLOSURE

1. Field of the Disclosure

The present disclosure relates to a system for conducting liquid fuel to a tank of an automotive vehicle.

2. Related Art

The ability to control, if not prevent, the flow of contamination from the ambient to a vehicular fuel tank is very important, particularly in the context of modern engines using fuel injection equipment having a low tolerance for contamination. Of course, vehicles are often parked outside, and experience extremes in terms of temperature variation. Such variations cause air trapped in a fuel tank to expand and contract, which may have the effect of drawing entrained atmospheric moisture or road splash past a fuel filler cap and into a fuel tank. If unaddressed, this situation may cause filters to plug or fill with water, with disastrous results for engine operation.

It would be desirable to provide a fuel filler system which prevents the ingress of contaminants from the ambient into the filler and fuel tank of a vehicle.

SUMMARY OF THE DISCLOSURE

According to an aspect of the present disclosure, a fuel filler system for an automotive vehicle includes a filler pipe connected with a fuel tank, and an interceptor mounted about an open end of the filler pipe, with the interceptor and the filler pipe defining a generally annular contaminant collector which is serviced by a drain extending from the collector. A filler cap closes both the open end of the filler pipe and an open end of the interceptor.

According to another aspect of the present disclosure, a filler cap is configured to prevent contaminants from passing from the generally annular contaminant collector, defined by the filler pipe and interceptor, into the filler pipe. The filler cap also prevents contaminants from passing from the ambient into the generally annular contaminant collector.

According to another aspect of the present disclosure, the interceptor is generally cylindrical and has a first end which is sealed to the filler pipe, and a second, open end, with the interceptor having an inside diameter which is greater than the outside diameter of the filler pipe, so as to allow the interceptor and filler pipe to define a generally annular contaminant collector. The interceptor preferably extends outwardly from the filler pipe so that the second, or open, end of the filler pipe is recessed within the interceptor so that a fuel filler nozzle may pass through the open end of the interceptor and into the fill pipe.

It is an advantage of a fuel filler system according to the present disclosure that the passage of contaminants from the ambient environment to the fuel tank will be prevented.

It is another advantage of a fuel filler system according to the present disclosure that even in the event that one of the seals incorporated in a filler cap according to this disclosure were to fail, contaminants would nevertheless be prevented from entering the fuel system of a vehicle. In cases in which a vacuum builds within the fuel tank, air will pass into the tank as the filler cap is removed, but the air will first need to pass along a torturous path, beginning with a drain tube having its outlet, or vacuum inlet, located in a position shielded from road splash and ambient moisture.

It is yet another advantage of a fuel filler system according to the present disclosure that the integrity of fuel systems of unfinished vehicles, such as chassis cabs, will be protected during storage periods before the vehicle is built out with a body.

It is yet another advantage of a fuel filler system according to the present disclosure that fuel tank pressure or vacuum will be relieved before the filler cap is completely removed. In essence, two seals incorporated in the cap are located such that when the filler cap is partially removed, an inner seal is released first, thus relieving fuel tank pressure or vacuum. Because the cap is still sealed with an outer seal, however, the pressure or vacuum is relieved through a collector without excess noise, and without directing fumes in the direction of the motorist.

Other advantages, as well as features of the present system, will become apparent to the reader of this specification.

DETAILED DESCRIPTION OF THE PREFERRED EMBODIMENTS

Figure 1:
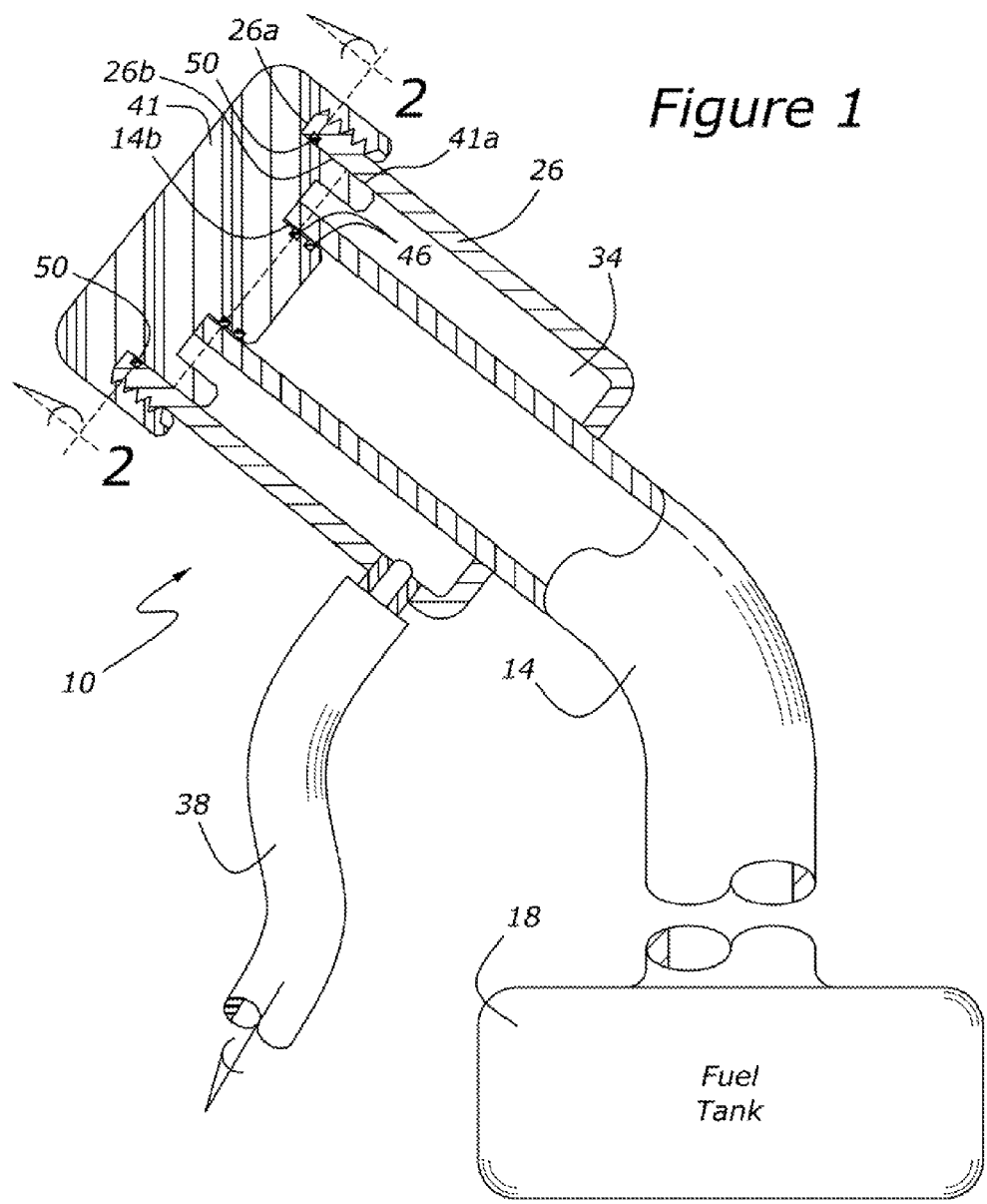
FIG. 1 is a partially schematic representation of a fuel filler system according to the present disclosure, with the fuel filler cap in a fully installed position.

As shown in FIG. 1, a fuel filler system, 10, has a filler pipe, 14, leading to a fuel tank 18. Cap 42 is applied to open end 14b of filler pipe 14 and also to open end, 26a, of an interceptor, 26. As shown in FIG. 1, interceptor 26 which is mounted about the open end, 14b, of filler pipe 14. As further shown in FIG. 1, interceptor 26 and filler pipe 14 define a generally annular contaminant collector, 34. Thus, any moisture which infiltrates past a first seal, 50, which interacts with cap 42, is allowed to flow from contaminant collector 34 through drain 38. Drain 38 conducts moisture from contaminant collector 34 to a location at the exterior of a vehicle.

Figure 2:
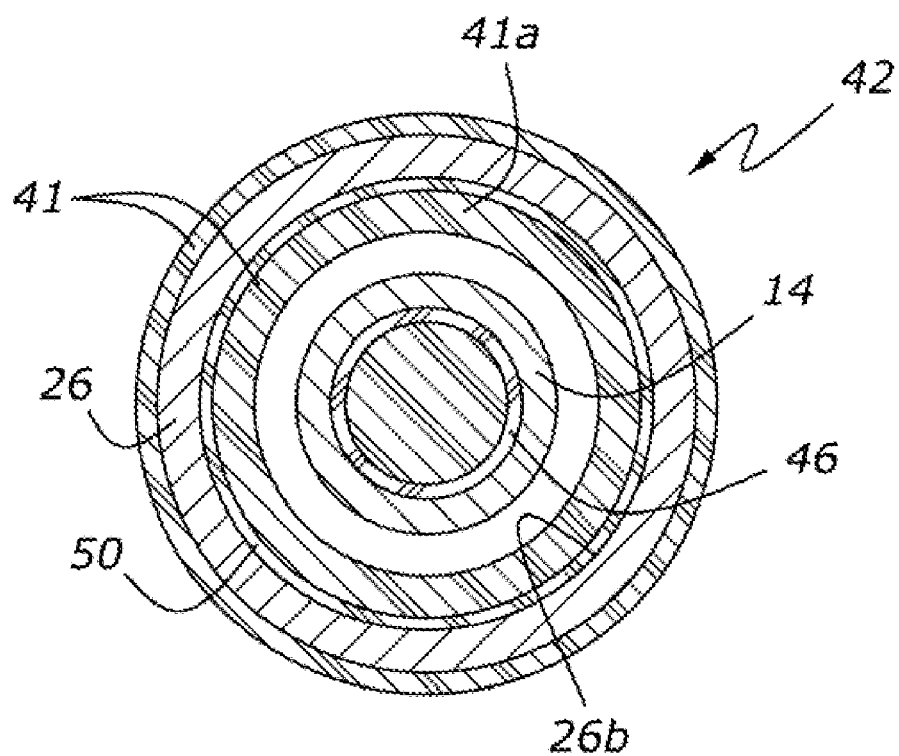
FIG. 2 is a plan view of the inside of a filler cap useful with the present fuel filter system.

Cap 42 has a larger diameter sealing provision 41a, which interacts with sealing element, 50, mounted to the inside surface, 26b, of interceptor 26. Cap 42 also has a smaller diameter seal set including O-rings, 46, which seal on the inside diameter, 14a, of filler pipe 14. Thus it is seen that even if seal 50 fails, and drain 38 were to plug, fluid would not pass into filler pipe 14 because it would be unable to pass by O-rings 46. FIG. 2 shows the various seals and sealing provisions.

It is further notable from FIG. 1 that filler pipe 14 is recessed within interceptor 26; this configuration aids in the prevention of contamination of fuel tank 18 resulting from the dripping of atmospheric moisture from other parts of a vehicle, or for that matter, directly from the ambient environment, into filler pipe 14. In essence, the uppermost portion of interceptor 26 functions as an anti-contamination shield which excludes falling moisture from filler pipe 14 whenever cap 42 has been removed, while allowing any moisture incidentally entering interceptor 26 to re released by drain 38.

Figure 3:
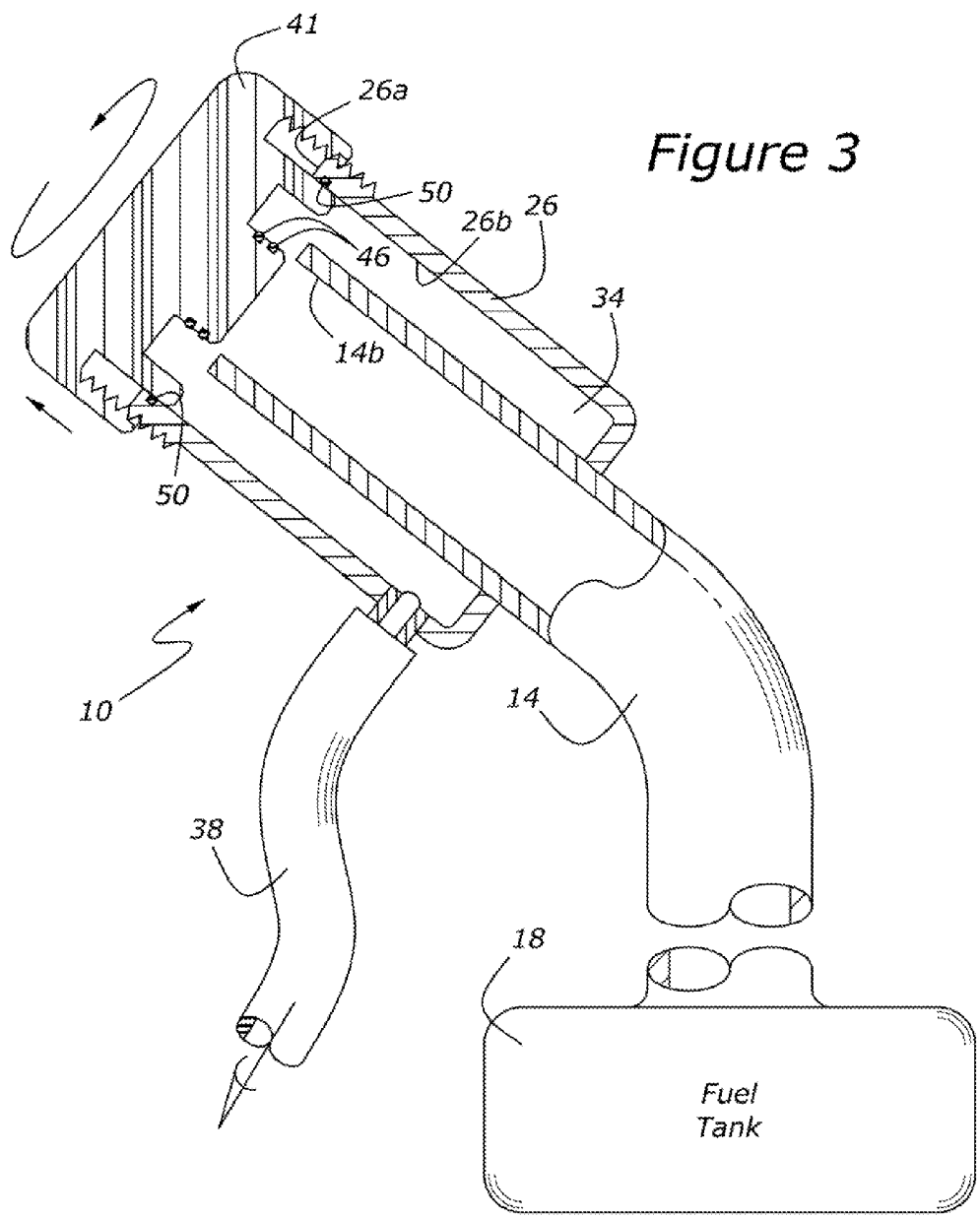
FIG. 3 is similar to FIG. 1, but shows a partially disengaged fuel filler cap.

As shown in FIG. 3, seals 50 and 46 are arranged such that removal of filler cap 41 will first cause pressure or vacuum within fuel tank 18 to be vented through the open end of filler pipe 14 and then through drain 38, while cap 41 remains sealed to interceptor 26 by seal 50. This function is attributable to the axial spacing of seals 50 and 46. Because venting occurs through drain 38, vapor will not be discharged from filler pipe 14, and motorists will not hear the sound of escaping gases.

Those skilled in the art will appreciate in view of this disclosure that filler pipe 14 and interceptor 26 may be formed as one-piece, from materials such as suitable plastic or composite materials, or may be formed alternatively as two pieces out of such materials as stamped steel. What is important is that interceptor 26 be sealed to filler pipe 14 by a generally annular end wall, which is shown at 30 in FIG. 1.

The foregoing system has been described in accordance with the relevant legal standards, thus the description is exemplary rather than limiting in nature. Variations and modifications to the disclosed embodiment may become apparent to those skilled in the art. The scope of legal protection can only be determined by studying the following claims.

What is claimed is:

1. A fuel filler system for an automotive vehicle, comprising:
   a filler pipe connected with a fuel tank;
   an interceptor mounted about an open end of said filler pipe, with said interceptor and said filler pipe defining a generally annular contaminant collector;
   a contaminant drain extending from said collector to the exterior of said vehicle; and
   a filler cap for closing both the open end of the filler pipe and an open end of said Interceptor.

2. A fuel filler system according to claim 1, wherein said filler cap is configured to prevent contaminants from passing from said generally annular contaminant collector into said filler pipe, and also to prevent contaminants from passing from the ambient into said generally annular contaminant collector.

3. A fuel filler system according to claim 1, wherein said faller cap comprises a larger diameter sealing provision for engaging an open end of said interceptor, and a smaller diameter sealing provision for engaging an inside diameter of said filler pipe.

4. A fuel filler system according to claim 3, wherein said larger diameter sealing provision engages a seal located upon an inside surface of said interceptor at a recessed location, whereby removal of the filler cap from the filler pipe will first cause venting of the fuel tank into said collector while the larger diameter seal is engaged with the interceptor.

5. A fuel filler system for an automotive vehicle, comprising:
   a filler pipe having a first end connected with a fuel tank, and a second, open, end for introducing fuel to the filler pipe and tank;
   an interceptor mounted coaxially about said second end of said filler pipe, with said interceptor being generally cylindrical and having a first end which is sealed to said filler pipe and a second, open end, with the interceptor having an inside diameter which is greater than the outside diameter of said filler pipe, and with said interceptor and said filler pipe defining a generally annular contaminant collector;
   a generally tubular contaminant drain extending from a lower portion of said contaminant collector to the exterior of a vehicle; and
   a filler cap having a first seal for closing the second end of the filler pipe, and a second seal for closing the second end of said interceptor, whereby contaminants will be prevented both from entering, said contaminant collector and from entering the filler pipe from said contaminant collector.

6. A fuel filler system according to claim 5, wherein said contaminant collector is defined by an outer surface of said filler pipe and an inner surface of said interceptor.

7. A fuel filler system according to claim 5, wherein the second end of the filler pipe is recessed within the second end of said interceptor, whereby removal of the filler cap from the filler pipe will first cause venting of the fuel tank into said collector while the filler cap is engaged with the interceptor.

8. A fuel filler system for an automotive vehicle, comprising:
   a filler pipe having a first end connected with a fuel tank, and a second, open, end for introducing fuel to the filler pipe and tank;
   a generally cylindrical interceptor mounted coaxially about said second end of said filler pipe, such that the second end of the filler pipe is recessed within said interceptor, with said interceptor having an open end permitting the passage of a fuel nozzle, and an inside diameter which is greater than the outside diameter of said filler pipe, and with said interceptor and said filler pipe defining a generally annular contaminant collector having a sealed annular end wall;
   a generally tubular contaminant drain extending from a lower portion of said contaminant collector to the exterior of a vehicle; and
   a filler cap having a first sealing provision for closing the second end of the filler pipe, and a second sealing provision for closing the open end of said interceptor, whereby contaminants will be prevented from entering said contaminant collector from the ambient, with contaminants also being prevented from entering said filler pipe from said contaminant collector.

9. A fuel filler system according to claim 8, wherein said first sealing provision comprises a sealing surface formed upon said filler cap, with said sealing surface engaging an elastomeric seal carried upon an inner surface of said interceptor when said filler cap is installed upon said filler pipe and said interceptor.

10. A fuel filler according to claim 8, wherein said first sealing provision and said second sealing provision are spaced axially along said filler cap such that removal of the filler cap from the filler pipe will first cause venting of the fuel tank into said collector while the filler cap is engaged with the interceptor.

* * * * *